(12) United States Patent
Tang et al.

(10) Patent No.: US 10,001,813 B1
(45) Date of Patent: Jun. 19, 2018

(54) BUMPER DEPLOYMENT MECHANISM AND ELECTRONIC DEVICE USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zhen-Wu Tang, Shenzhen (CN); Qian-Fa Zhao, Shenzhen (CN); Tai-Shan Zhu, Shenzhen (CN); Jun-Liang Zhang, Shenzhen (CN)

(73) Assignees: Fu Tai Hua Industry (Shenzhen) Co., Ltd., Shenzhen (CN); HON HAI PRECISION INDUSTRY CO., LTD, New Taipei (TW)

( * ) Notice: Subject to any disclaimer, the term of this patent is extended or adjusted under 35 U.S.C. 154(b) by 0 days. days.

(21) Appl. No.: 15/696,184

(22) Filed: Sep. 6, 2017

(30) Foreign Application Priority Data

Mar. 28, 2017 (CN) .......................... 2017 1 0192019

(51) Int. Cl.
*G06F 1/16* (2006.01)
*H05K 5/00* (2006.01)
*H02P 31/00* (2006.01)

(52) U.S. Cl.
CPC ............ *G06F 1/1656* (2013.01); *G06F 1/166* (2013.01); *H02P 31/00* (2013.01); *H05K 5/0017* (2013.01)

(58) Field of Classification Search
CPC ................................ G06F 1/166; G06F 1/1656
USPC ..................................................... 361/679.59
See application file for complete search history.

(56) References Cited

U.S. PATENT DOCUMENTS

| | | | | |
|---|---|---|---|---|
| 7,328,880 | B2* | 2/2008 | Helot ..................... | A47B 91/02 248/188.3 |
| 7,679,905 | B2* | 3/2010 | Wu ....................... | G06F 1/1613 248/372.1 |
| 8,537,546 | B2* | 9/2013 | Shih ..................... | H05K 5/0234 361/679.59 |
| 2009/0231805 | A1* | 9/2009 | Schlesener .......... | B29C 45/1676 361/679.55 |
| 2014/0362507 | A1* | 12/2014 | Kinoshita ............ | G06F 1/1681 361/679.09 |
| 2015/0001368 | A1* | 1/2015 | Sprenger ............... | G06F 1/1633 248/550 |
| 2017/0102746 | A1* | 4/2017 | Knepper ................ | G06F 1/206 |

* cited by examiner

*Primary Examiner* — Nidhi Thaker
(74) *Attorney, Agent, or Firm* — ScienBiziP, P.C.

(57) ABSTRACT

An electronic device which is protected against screen breakage when dropped includes a display panel defining a through hole, a gravity sensor, a processor, and a bumper deployment mechanism. The bumper deployment mechanism includes a first elastic part and a connected rotating mechanism. The rotating mechanism includes a motor. The processor can compare a detected acceleration value with a preset acceleration value. When the detected acceleration value represents free-fall motion, which is greater than the preset acceleration value, the processor controls the motor to drive the first elastic part to pass through the through hole of the display panel and protrude from the display panel as a shock absorber.

9 Claims, 6 Drawing Sheets

BUMPER DEPLOYMENT MECHANISM AND ELECTRONIC DEVICE USING THE SAME

CROSS-REFERENCE TO RELATED APPLICATIONS

This application claims priority to Chinese Patent Application No. 201710192019.4 filed on Mar. 28, 2017, the contents of which are incorporated by reference herein.

FIELD

The subject matter herein generally relates to electronic product field, and particularly, to a bumper deployment mechanism and electronic device using the same.

BACKGROUND

Some electronic products, such as smart phone or tablet computer has a larger display screen. Due to the fact that the display screen of the electronic product is relatively fragile, if the electronic product falls accidentally, the display screen can be easily broken. Thus, an unnecessary loss is suffered by the user.

BRIEF DESCRIPTION OF THE DRAWINGS

Implementations of the present disclosure will now be described, by way of example only, with reference to the attached figures.

DETAILED DESCRIPTION

Figure 1:
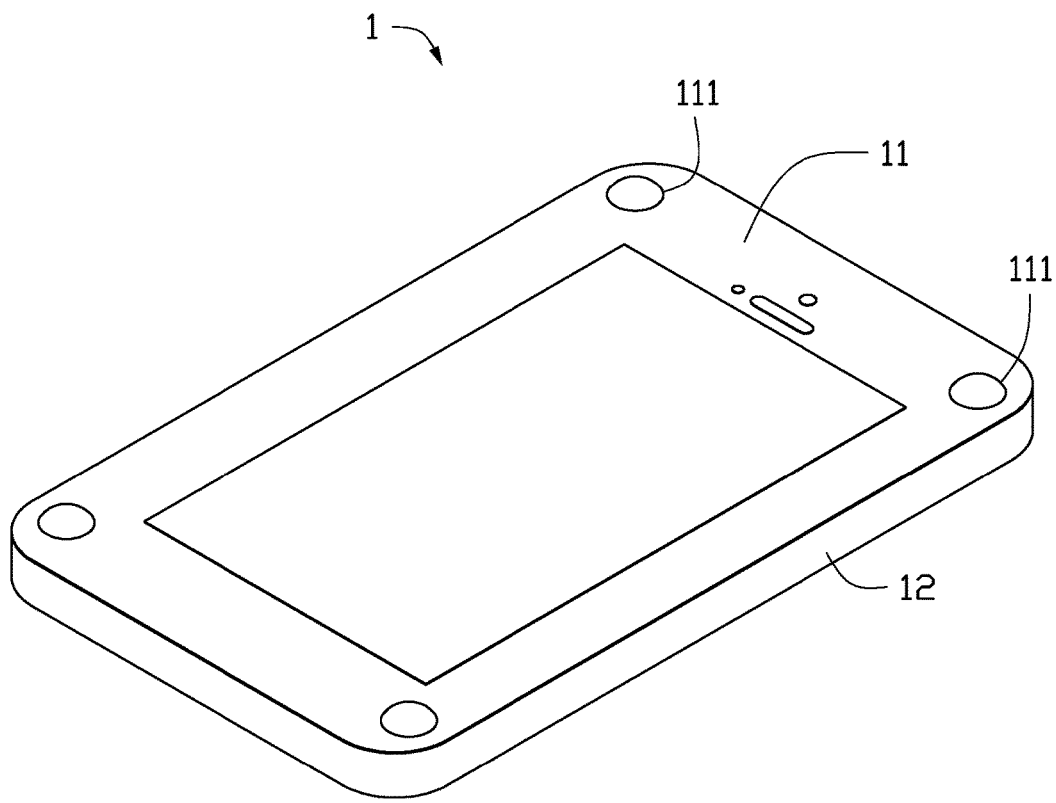
FIG. 1 is an isometric view showing an exemplary embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

The term "comprising" means "including, but not necessarily limited to"; it specifically indicates open-ended inclusion or membership in a so-described combination, group, series and the like.

Exemplary embodiments of the present disclosure will be described in relation to the accompanying drawings.

Figure 2:
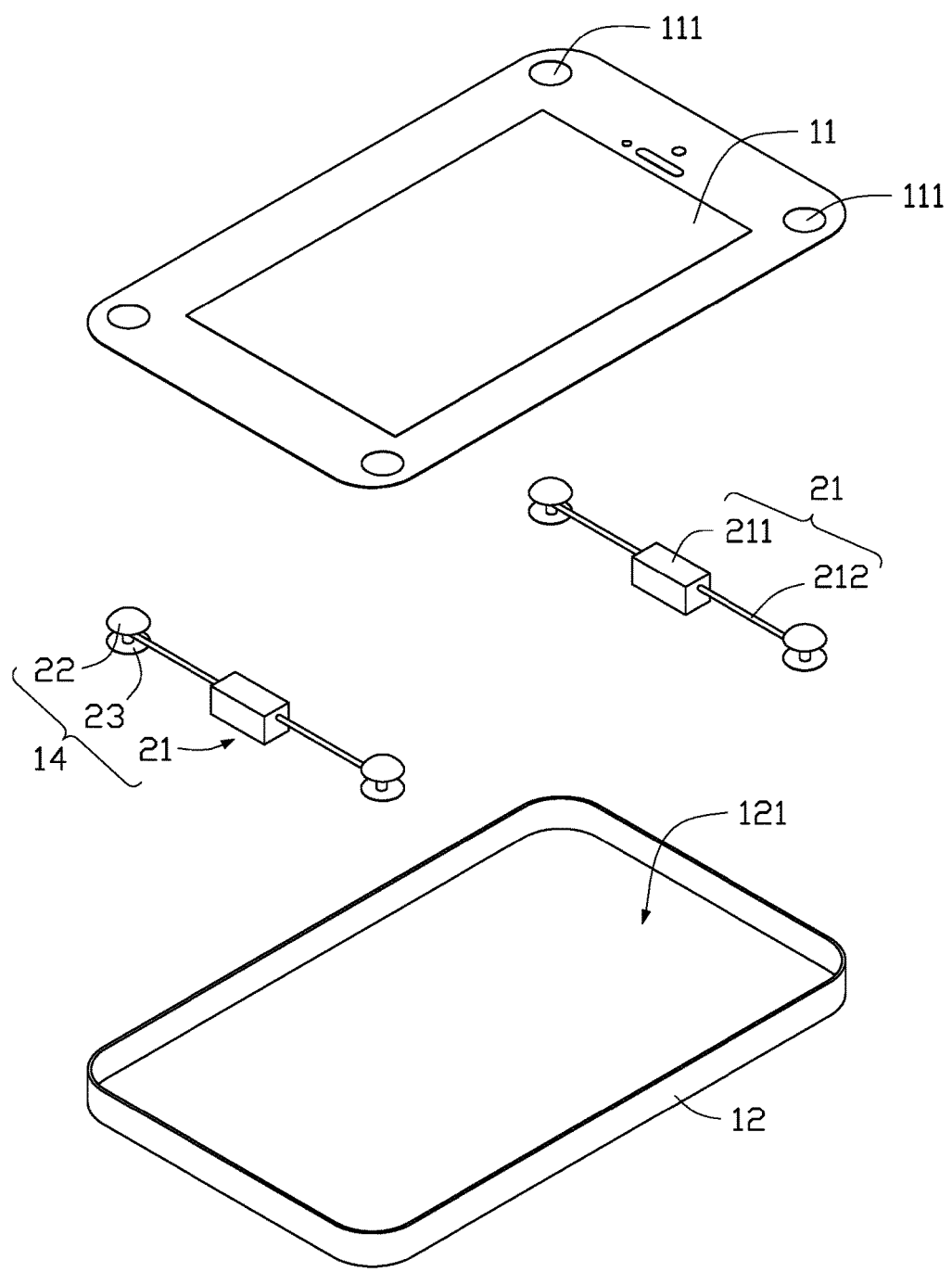
FIG. 2 is an exploded, isometric view of the electronic device of FIG. 1.
Figure 6:
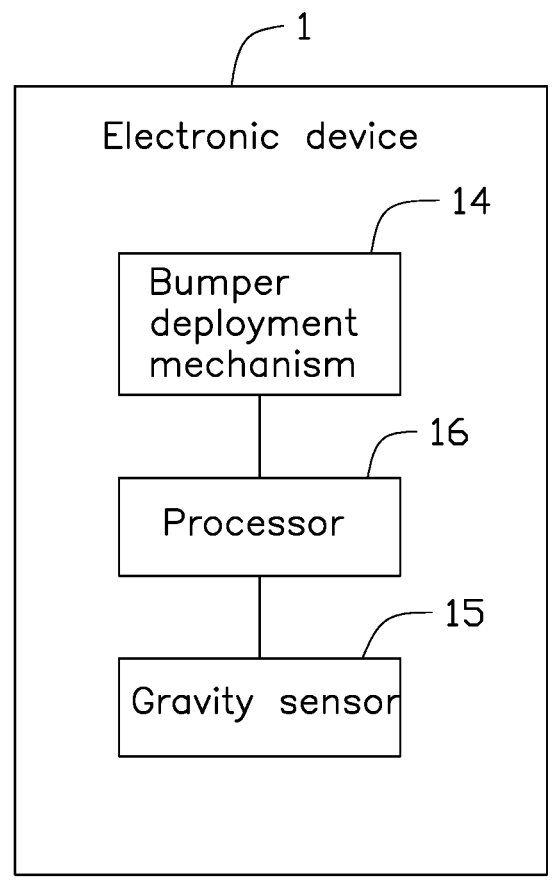
FIG. 6 is a block diagram illustrating an exemplary embodiment of the electronic device of FIG. 1.

FIG. 1 illustrates an isometric view showing an exemplary embodiment of an electronic device 1. The electronic device 1 includes, but is not limited to, a display panel 11 and a lower cover 12. The display panel 11 covers the lower cover 12. The display panel 11 defines a through hole 111. FIG. 2 illustrates an exploded, isometric view of the electronic device 1. The lower cover 12 defines a receiving cavity 121. In at least one exemplary embodiment, the electronic device 1 further includes a bumper deployment mechanism 14, a gravity sensor 15, and a processor 16 (referring to FIG. 6). The bumper deployment mechanism 14, the gravity sensor 15, and the processor 16 are received in the receiving cavity 121.

In at least one example exemplary embodiment, the bumper deployment mechanism 14 includes a rotating mechanism 21, a first elastic part 22, and a second elastic part 23. The rotating mechanism 21 connects to the first elastic part 22 and the second elastic part 23. The processor 16 electronically connects to the gravity sensor 15 and the rotating mechanism 21. The gravity sensor 15 is used to detect an acceleration value of the electronic device 1 and sends the acceleration value of the electronic device 1 to the processor 16. When receiving the acceleration value of the electronic device 1, the processor 16 compares the detected acceleration value with a preset acceleration value. When the detected acceleration value is greater than the preset acceleration value, the processor 16 rotates the rotating mechanism 21 to drive the first elastic part 22 through the through hole 111 of the display panel 11, the elastic part 22 thus protrudes from the display panel 11 to protect the display panel 11. In at least one exemplary embodiment, the preset acceleration value is equal to the free fall acceleration value.

Figure 3:
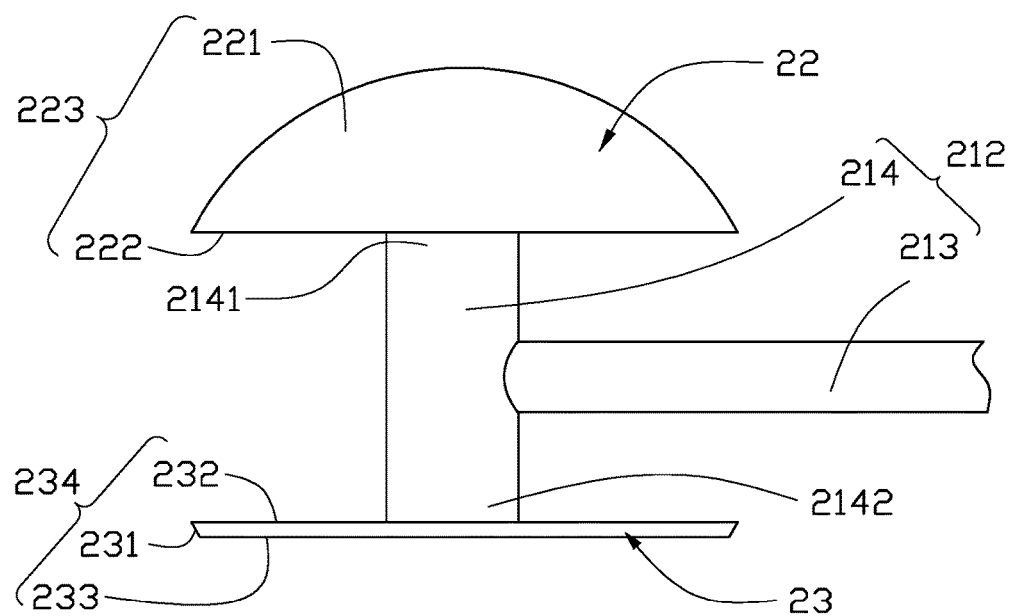
FIG. 3 is an isometric view showing a rod connected to a first elastic part of the device of FIG. 1.

In at least one exemplary embodiment, the number of the through holes 111 of the display panel 11 is four. The four through holes 111 are located in the four corners of the display panel 11. The number of the rotating mechanisms 21 is two. Each rotating mechanism 21 connects to two first elastic parts 22. Each rotating mechanism 21 corresponds to two through holes 111. Each rotating mechanism 21 is used to drive the two first elastic parts 22 corresponding to the rotating mechanism 21 to pass through the two through holes 111 of the display panel 11 and protrude from the display panel 11. In at least one exemplary embodiment, each rotating mechanism 21 includes a motor 211 and a rotating shaft 212. The motor 211 connects to the rotating shaft 212 and drives the rotating shaft 211 to rotate. FIG. 3 illustrates an isometric view showing the rotating shaft 212. The rotating shaft 212 includes a rod body 213 and two connecting rods 214. In at least one exemplary embodiment, the rotating shaft 212 is integrated. Two connecting rods 214 extend out from two ends of the rod body 213. In another embodiment, the two connecting rods 214 are fixed on the rod body 213. The position of each connecting rod 214 corresponds to the position of one through hole 111 of the display panel 11. Each connecting rod 214 includes a first end 2141 and a second end 2142 relative to the first end 2141. The first end 2141 of the connecting rod 214 connects to the first elastic part 22. The second end 2142 connects to the second elastic part 2142. In at least one exemplary embodiment, the first elastic part 22 and the second elastic part 23 are made of silicone material. The first elastic part 22 includes a first curved surface 221 and a first connecting surface 222. The first curved surface 221 connects to the first connecting surface 222. The first curved surface 221 and the first connecting surface 222 together form an arc-shaped convex head 223. The first end 2141 of the connecting rod 214 connects to the first connecting surface 222. The first curved surface 221 is matched with the through hole 111 of the display panel 11, which makes the first elastic part 22 rotate in the through hole 111.

The second elastic part 23 includes a second curved surface 231, a second connecting surface 232, and a plane 233. The second curved surface 231 connects to the second connecting surface 232 and the plane 233. The second curved surface 231, the second connecting surface 232, and the plane 233 together form a flat head part 234. The second end 2142 of the connecting rod 214 connects to the second connecting surface 232. The second curved surface 231 is also matched with the through hole 111 of the display panel 11, which makes the second elastic part 23 rotate in the through hole 111. When the motor 211 rotates the rotating shaft 212, the rotating shaft 212 drives the first elastic part 22 and the second elastic part 23 to rotate, which causes the electronic device 1 to change from a first state to a second state. In the first state, the arc-shaped convex head 223 of the first elastic part 22 protrudes from the through hole 111 of the display panel 11. In a second state, the flat head part 234 of the second elastic part 23 seals the through hole 111 of the display panel 11.

Figure 4:
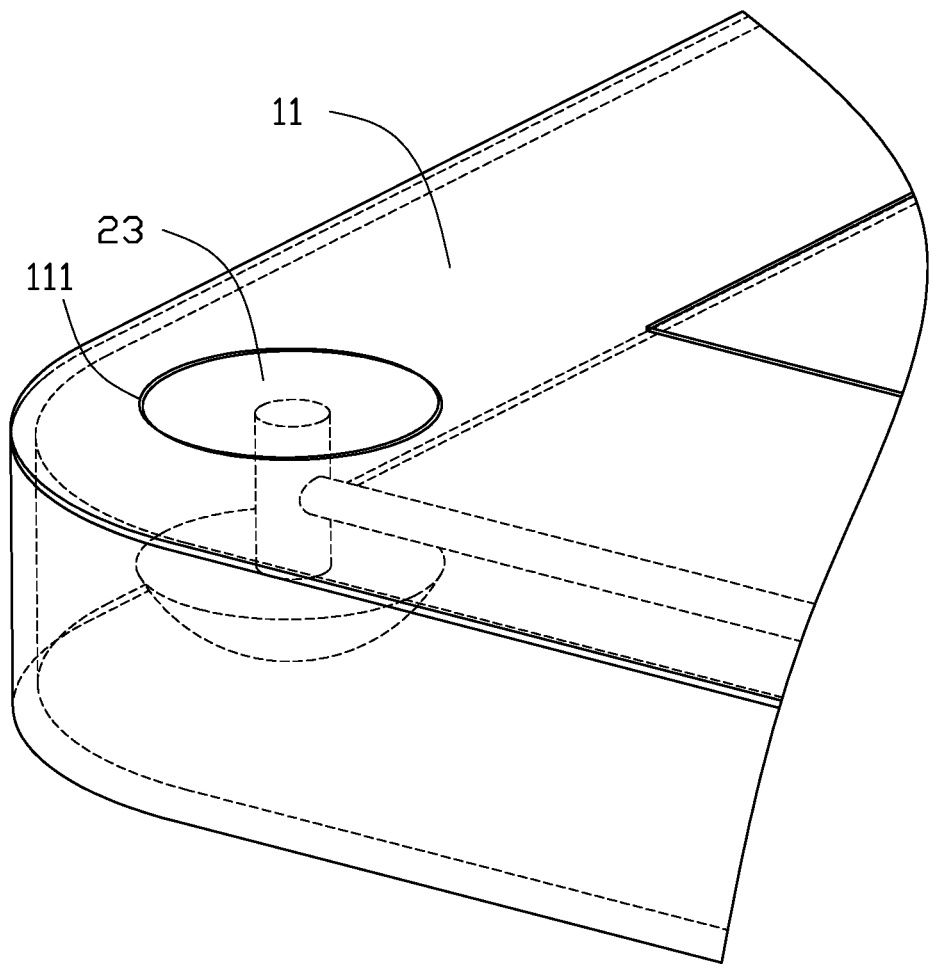
FIG. 4 is an isometric view showing a first working state of the electronic device of FIG. 1.
Figure 5:
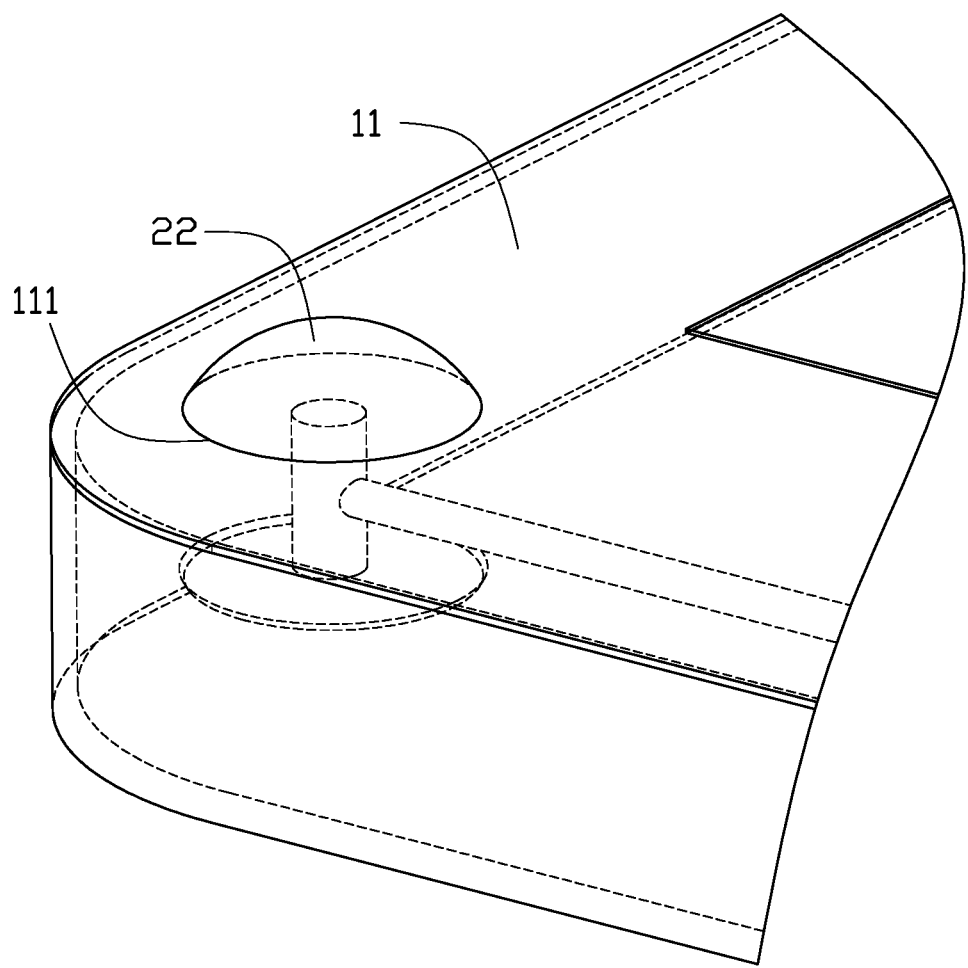
FIG. 5 is an isometric view showing a second working state of the electronic device of FIG. 1.

FIGS. 4-5 illustrate the working states of the electronic device 1. The electronic device 1 works as follows. The electronic device 1 works in an original default state (the second state), in which the flat head part 234 of the second elastic part 23 seals the through hole 111 of the display panel 11. When the processor 16 determines that the acceleration value of the electronic device 1 is greater than the preset acceleration value, the processor 16 controls the motor 211 of the rotating mechanism 21 to rotate the rotating shaft 212. With the driving of the rotating shaft 212, the flat head part 234 of the second elastic part 23 rotates in the through hole 111 of the display panel 11 and moves away from the through hole 111. When the rotating shaft 212 rotates by 180 degrees, the arc-shaped convex head 223 of the first elastic part 22 moves into the through hole 111 and protrudes from the through hole 111 of the display panel 11 to put the electronic device 1 in the first state. Thus, with the driving of the rotating shaft 212, the electronic device 1 changes from the second state to the first state. When the electronic device 1 works in the first state, the arc-shaped convex head 223 of the first elastic part 22 protrudes from the through hole 111 of the display panel 11 and can function as a shock absorber. The display panel 11 of the electronic device 1 can thus be protected by the first elastic part 22 when the electronic device 1 is dropped.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including, the full extent established by the broad general meaning of the terms used in the claims.

What is claimed is:

1. A bumper deployment mechanism included in an electronic device comprising: a first elastic part; and a rotating mechanism, comprising: a rotating shaft connected to the first elastic part; and a motor configured to drive the rotating shaft to rotate to make the first elastic part protrude from the electronic device; wherein the bumper deployment mechanism comprises a second elastic part, the rotating shaft comprises a rod body and two connecting rods, the two connecting rods respectively extend out from two ends of the rod body, each of the connecting rod comprises a first end and a second end, the first end of the connecting rod connects to the first elastic part, the second end of the connecting rod connects to the second elastic part; and wherein the first elastic part comprises a first curved surface and a first connecting surface, the first curved surface connects to the first connecting surface, the first curved surface and the first connecting surface together form an arc-shaped convex head, the first end of the connecting rod connects to the first connecting surface.

2. The bumper deployment mechanism as recited in claim 1, wherein the second elastic part comprises a second curved surface, a second connecting surface, and a plane, the second curved surface connects to the second connecting surface and the plane, the second curved surface, the second connecting surface, and the plane together form a flat head part, the second end of the connecting rod connects to the second connecting surface.

3. The bumper deployment mechanism as recited in claim 1, wherein the first elastic part and the second elastic part are made up of silicone material.

4. The bumper deployment mechanism as recited in claim 1, wherein the two connecting rods are fixed on the rod body.

5. An electronic device comprising: a display panel defining a through hole; a bumper deployment mechanism comprising: a first elastic part; and a rotating mechanism, comprising: a rotating shaft connected to the first elastic part; and a motor configured to drive the rotating shaft to rotate to make the first elastic part protrude from the through hole of the electronic device; a gravity sensor configured to detect an acceleration value of the electronic device; and a processor connected to the gravity sensor and the motor, and configured to: compare the detected acceleration value with a preset acceleration value; and control the motor to rotate the rotating shaft to drive the first elastic part to pass through the through hole of the display panel and protrude from the display panel to protect the display panel when the detected acceleration value is greater than the preset acceleration value; wherein the bumper deployment mechanism comprises a second elastic part, the rotating shaft comprises a rod body and two connecting rods, the two connecting rods respectively extend out from two ends of the rod body, each of the connecting rod comprises a first end and a second end, the first end of the connecting rod connects to the first elastic part, the second end of the connecting rod connects to the second elastic part.

6. The electronic device as recited in claim 5, wherein the first elastic part comprises a first curved surface and a first connecting surface, the first curved surface connects to the first connecting surface, the first curved surface and the first connecting surface form an arc-shaped convex head, the first end of the connecting rod connects to the first connecting surface.

7. The electronic device as recited in claim 5, wherein the second elastic part comprises a second curved surface, a second connecting surface, and a plane, the second curved surface connects to the second connecting surface and the plane, the second curved surface, the second connecting surface, and the plane form a flat head par, the second end of the connecting rod connects to the second connecting surface.

8. The electronic device as recited in claim 5, wherein the first elastic part and the second elastic part are made up of silicone material.

9. The electronic device as recited in claim 5, wherein the two connecting rods are fixed on the rod body.

\* \* \* \* \*